(12) United States Patent
Warrilow

(10) Patent No.: US 10,405,649 B2
(45) Date of Patent: Sep. 10, 2019

(54) POWER AND DATA BRIDGE

(71) Applicant: EVOQUE GROUP LLC, San Antonio, TX (US)

(72) Inventor: Luke Warrilow, San Antonio, TX (US)

(73) Assignee: EVOQUE GROUP LLC, San Antonio, TX (US)

( * ) Notice: Subject to any disclaimer, the term of this patent is extended or adjusted under 35 U.S.C. 154(b) by 289 days.

(21) Appl. No.: 15/590,853

(22) Filed: May 9, 2017

(65) Prior Publication Data

US 2017/0324230 A1 Nov. 9, 2017

Related U.S. Application Data

(60) Provisional application No. 62/333,314, filed on May 9, 2016.

(51) Int. Cl.
*A47B 21/06* (2006.01)
*H02G 3/04* (2006.01)

(52) U.S. Cl.
CPC ........ *A47B 21/06* (2013.01); *A47B 2021/066* (2013.01); *H02G 3/045* (2013.01); *H02G 3/0437* (2013.01)

(58) Field of Classification Search
CPC ............. H02G 3/12; F16M 13/02; H02B 1/20
USPC ........................................................ 174/97
See application file for complete search history.

(56) References Cited

U.S. PATENT DOCUMENTS 4,792,881 A * 12/1988 Wilson .................. A47B 21/06
312/223.6
7,626,120 B1 * 12/2009 Golden ................... H02G 3/185
174/135

* cited by examiner

*Primary Examiner* — Dhiru R Patel
(74) *Attorney, Agent, or Firm* — William H. Honaker; Dickinson Wright PLLC

(57) ABSTRACT

A bridge structure is disclosed for concealing electrical and data connections. The bridge includes at least one beam having a bottom, sidewalls, a cover and opposed open ends. Each of the sidewalls has at least one connecting tab protruding outwardly adjacent the open ends for attachment to support members. The beam contains at least one electrical outlet or data port. At least first and second support members are provided for supporting the beam. The first and second support members are positioned adjacent the opposed open ends of the beam. The first and second support members have at least one slot for receipt of the at least one connecting tab to connect the beam to the support member.

38 Claims, 16 Drawing Sheets

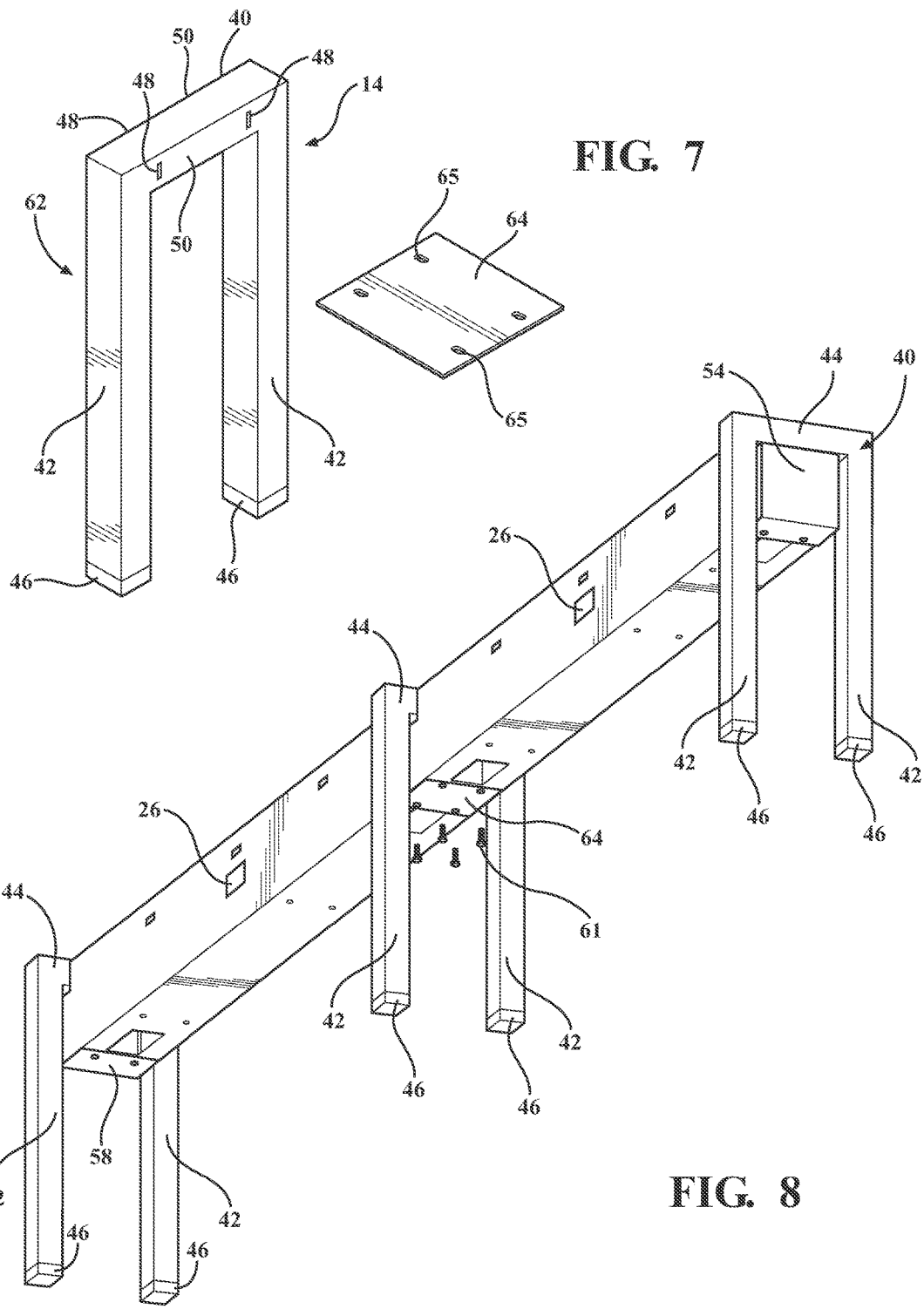

POWER AND DATA BRIDGE

RELATED APPLICATIONS

This application claims the benefit of U.S. Provisional Application No. 62/333,314 filed on May 9, 2016.

STATEMENT REGARDING FEDERALLY SPONSORED RESEARCH

None.

TECHNICAL FIELD

This invention relates generally to office environments, and more particularly to office furniture and the ability to effectively conceal the unsightly wires and cables necessary for today's office equipment.

BACKGROUND OF THE INVENTION

In today's typical office environment, there are numerous power lines, wires and cables snaking out of the equipment we use and extending to power sources. At a minimum, these power lines, wires and cables are unsightly and in some situations can be unsafe. This is particularly true in today's open office environments where desks are in the open and in various orientations and wires can cross walking routes of employees.

What is needed is a system to conceal the various wires and cables making the office environment more attractive and safer.

SUMMARY OF THE INVENTION

In general terms, this invention provides a power and data bridge for use in securing and concealing power and data cables. The present invention is particularly useful in office environments and even more useful in open office environments. The present invention is also very well suited for use with so called sit and stand desks.

The present invention is a bridge structure for concealing electrical wires, power and data cables and connections. The bridge includes at least one beam having a bottom, sidewalls, a cover and opposed open ends. Electrical and power outlets and data connections are mounted in the beam. Each of the sidewalls has at least one connecting tab protruding outwardly adjacent the open ends for connecting the beam to supports.

At least first and second support members are provided for supporting the beam. The first and second support members are positioned adjacent the opposed open ends of the beam. The support members have at least one slot for receipt of the at least one connecting tab to connect the beam to the support member. In the disclosed embodiment, one of the support members is generally u-shaped and the other can be u-shaped or shaped in a number of different configurations to provide various layouts.

An end cap is mounted to the u-shaped support member adjacent the open end of the beam. The end cap has a vertical wall and a support ledge for supporting the beam. The end cap vertical wall conceals the open end of the beam but still allows the beam to be open along its entire length for routing wires and cables.

In the disclosed embodiment, the generally u-shaped support member has two opposed support legs interconnected by a cross support bar. As illustrated, the support member is a tube and more specifically a square tube.

As disclosed in one embodiment, the second support member is a 120-degree support member for connecting three beams to the second support member. The 120-degree support member has a triangular box with three equilateral sides, each of the equilateral sides has at least one slot for receipt of the at least one connecting tab. The 120-degree support member is closed from the exterior, but is open in the interior to allow routing of cables, wires, etc.

In a further embodiment, the second support member is a ninety degree support member for connecting two beams to the second support member. The ninety degree support member has a v-shaped cross bar. The v-shaped cross bar has an apex and opposed arms, and as disclosed first, second and third support legs. The first leg extends from the apex, the second leg extends from one of the opposed arms and the third leg extends from the other opposed arm. The ninety degree support member is closed from the exterior, but has an open interior to allow routing of cables, wires, etc.

In a still further embodiment, the second support member is a three way support member for connecting three beams to the second support member. The three way support member has a three arm cross bar. The second and third arms extend at 90 degree angles to the first arm. At least one support leg extends from the three arm cross bar. As with the other support members, the three way support member exterior is closed, but has an open interior to allow routing of cables, wires, etc. through the beams and the second support member.

The bridge structure can also include an optional leg to beam bracket for connecting the beam to a leg. The leg to beam bracket has a base for connection to the beam and opposed connectors for connecting to the legs.

In a further embodiment, the bridge structure can include a cover with two elongated panels that can slide laterally with respect to one another.

A still further embodiment includes a panel bracket for attaching a privacy panel to the bridge. The panel bracket includes a base for mounting to the bridge and two spaced ears for receipt of a privacy panel. The spaced ears have at least one set screw and at least one push plate. The push plate is adapted to fit between the ears, adjacent the set screw such that the set screw can be threaded against the push plate to squeeze a panel between the two spaced ears to hold the privacy panel in place.

The power and data bridge of the present invention provides a low cost, attractive solution to the manufacture and assembly of power and data bridges. The invention is a modular unit that includes a beam that supports and conceals the power and data cables. The beam has a cover to close the open top. The cover can be easily opened to access the interior. The interior includes power outlets. The power outlets of the disclosed embodiment are modular so that outlets can be added or subtracted depending upon the number of outlets required.

The beam is supported by support members that can take various shapes and provide for various unit orientations. The disclosed support members are straight, L-shaped, U-shaped and triangular. These accommodate various office layouts and can be combined to provide any number of orientations.

The beams, legs, brackets and covers can be made of metal, steel, aluminum, or plastic or composites or combinations of these. The various pieces can be connected together using any variety of methods, such as tabs, screws, nuts and bolts, clips, press fitting, welding etc.

These and other features and advantages of this invention will become more apparent to those skilled in the art from the detailed description. The drawings that accompany the detailed description are described below.

BRIEF DESCRIPTION OF THE DRAWINGS

FIG. 7 is a perspective view of an intermediate support member of the present invention.

FIG. 8 is a perspective bottom view of an embodiment of bridge structure of the present invention.

DETAILED DESCRIPTION OF A PREFERRED EMBODIMENT

Figure 2:
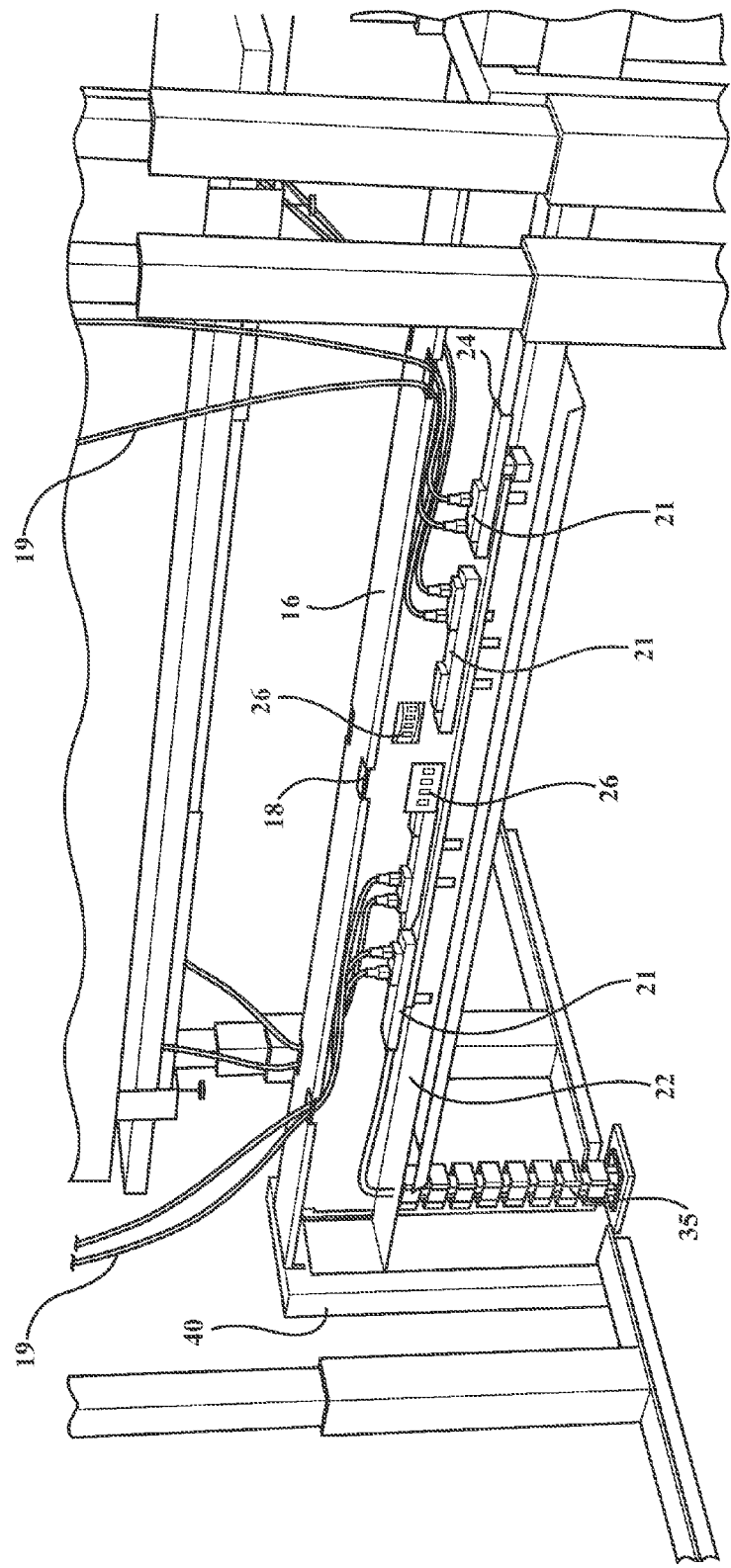
FIG. 2 is a cutaway perspective view of the bridge structure of the present invention.
Figure 16:
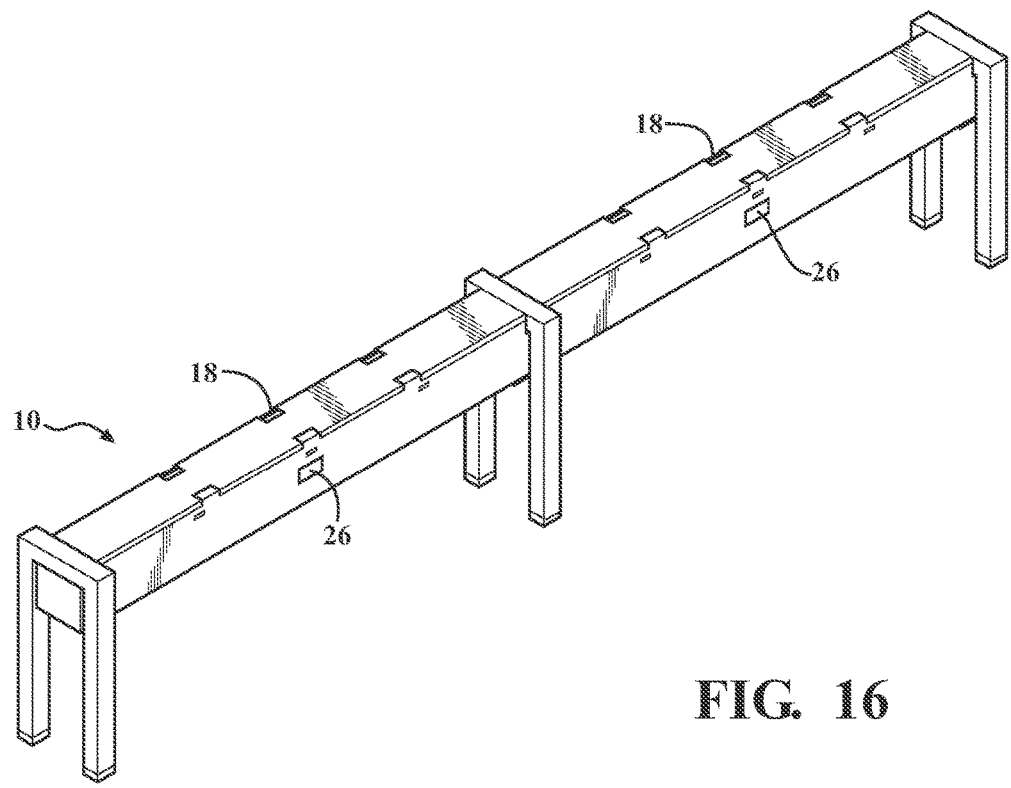
FIG. 16 is a perspective view of a further embodiment of the bridge structure of the present invention.
Figure 17:
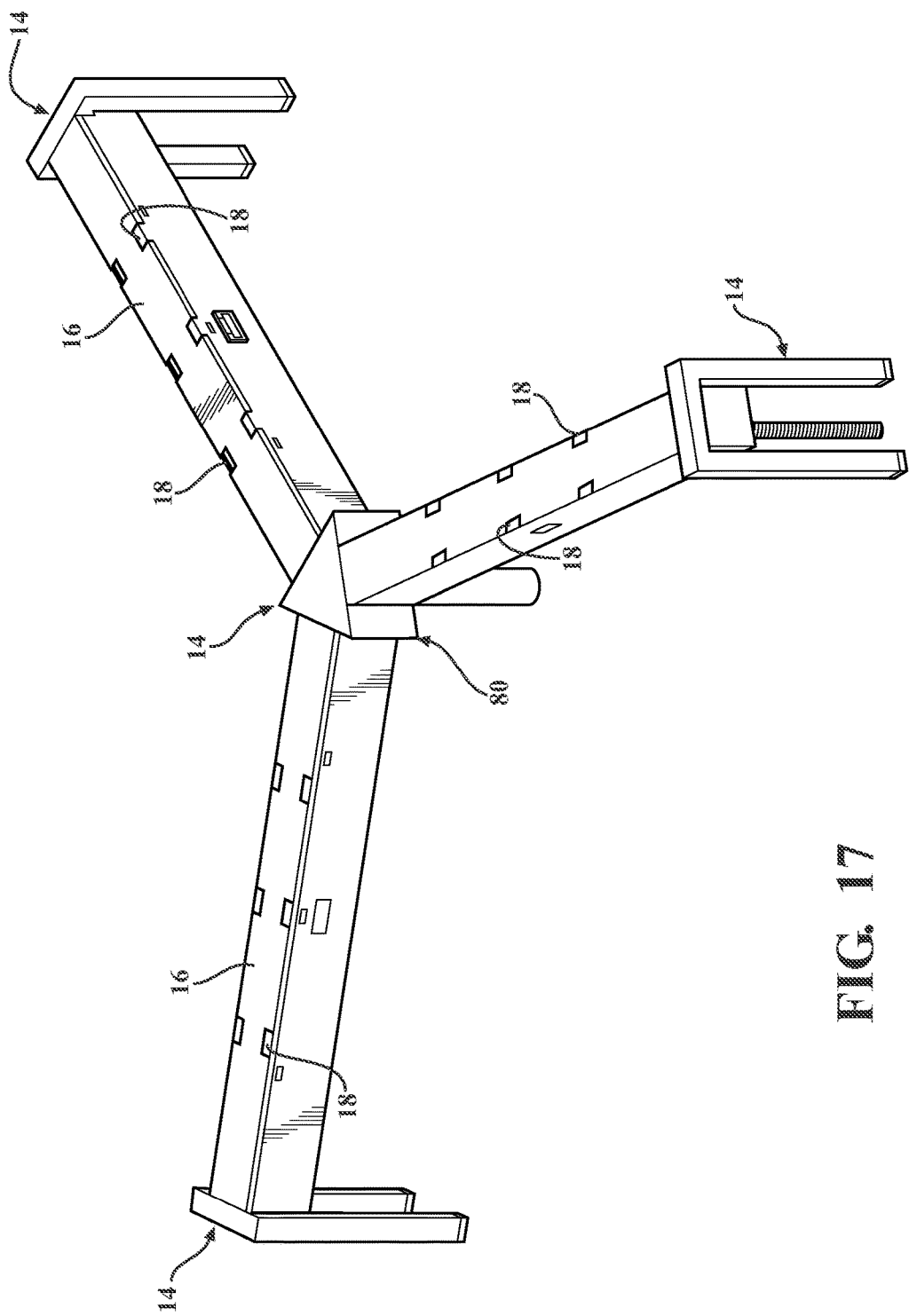
FIG. 17 is a top perspective view of FIG. 12.

FIG. 16 is a perspective view of a further embodiment of the bridge structure of the present invention. The power and data bridge of the present invention is shown generally at 10. The bridge 10 includes a beam 12, support members 14 of various configurations which will be described below and a cover 16 to close the open top of beam 12. As illustrated in drawings, the cover 16 can have two or more spaced generally rectangular openings 18 along the length of the cover 16. The openings 18 are illustrated as slots down the center or on the edges of the cover 16. The openings 18 allow data and power cables and wires 19 to pass through the cover 16 and into the interior of the beam 12. As illustrated in FIG. 2, power outlets 21 are mounted in the bottom 22 of the beam 12. The number of power outlets 21 can be easily changed to provide the desired number of outlets. Additional outlets can be connected to the bottom 22 of the beam 12 by either, snapping them into a holder or screwing them to a bracket in the beam 12.

The beam 12 as illustrated has two opposed sidewalls 24, the bottom 22 and an open top closed by the removable or moveable cover 16. With reference to the various figures, the sidewalls 24 include one or more data port openings 26 for the receipt of data cables either entering or exiting the beam 12. In the disclosed embodiment, a data port faceplate is mounted over the opening 26 for the use of data connections between the equipment and the bridge 10. As will be appreciated, the main data cable is contained within the beam 12 and leads extend to the ports in the openings 26 to provide data connections between the workspace and the beam. It should be appreciated that all the connections could be housed within the beam 12 or the data ports could be positioned in the cover 16.

The beam 12 also includes access openings 34 in the bottom 22 of the beam 12 for the receipt of data or power cables. The data and power cables would enter the beam 12 from for example the floor through the openings 34. In the disclosed embodiment, the data and power cables are illustrated as being housed in cable vertebrae 35. The power cable would preferably connect to the outlets and the data cable would connect to the data ports.

Figure 1:
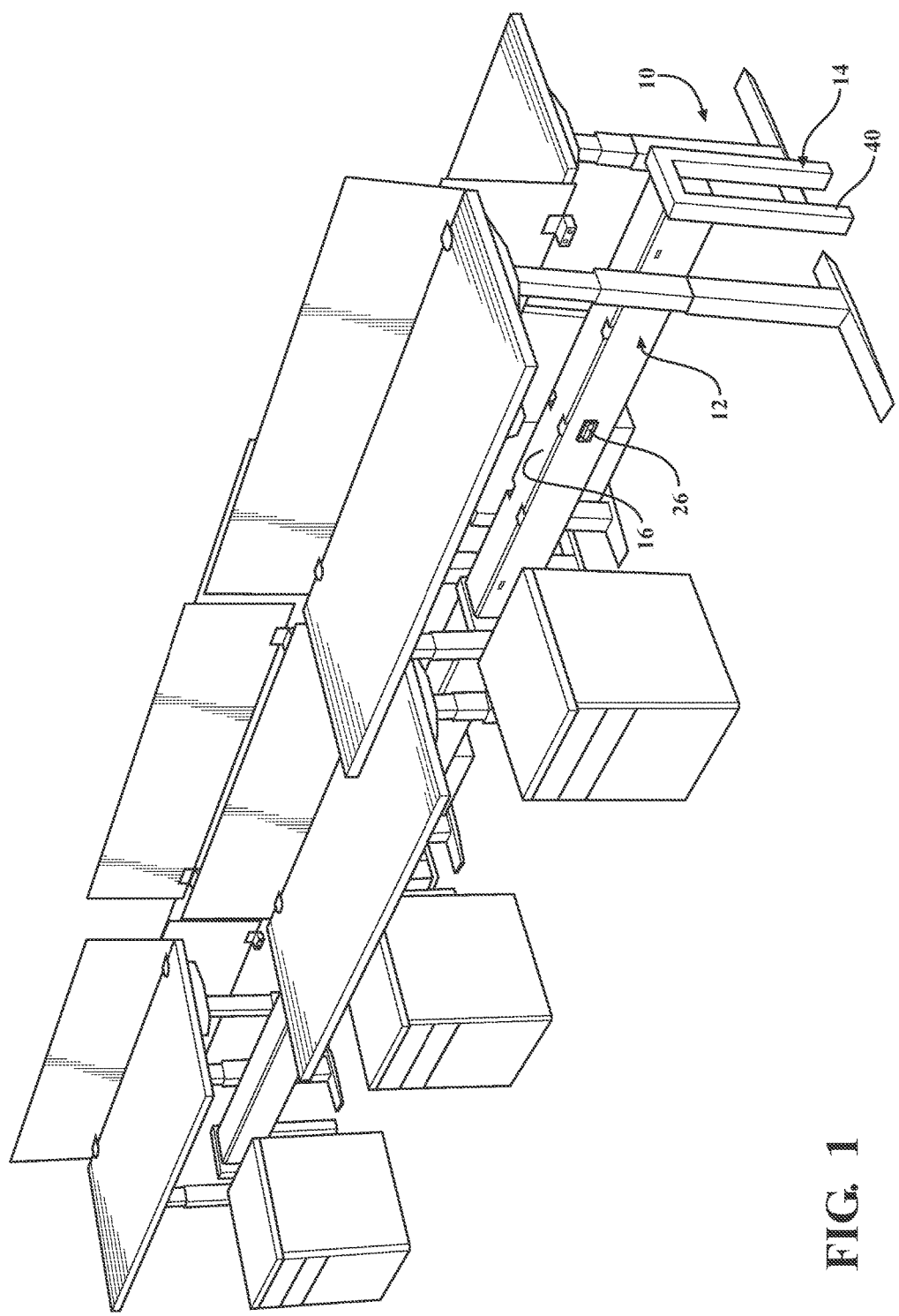
FIG. 1 is a perspective view of the bridge structure of the present invention.
Figure 3:
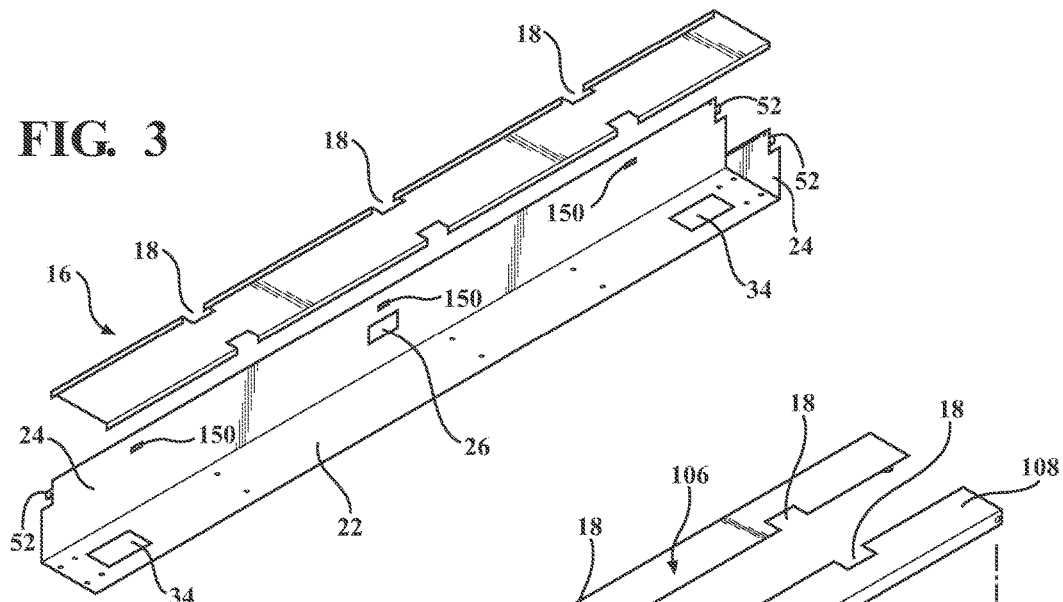
FIG. 3 is a perspective bottom view of the beam of the present invention.
Figure 6:
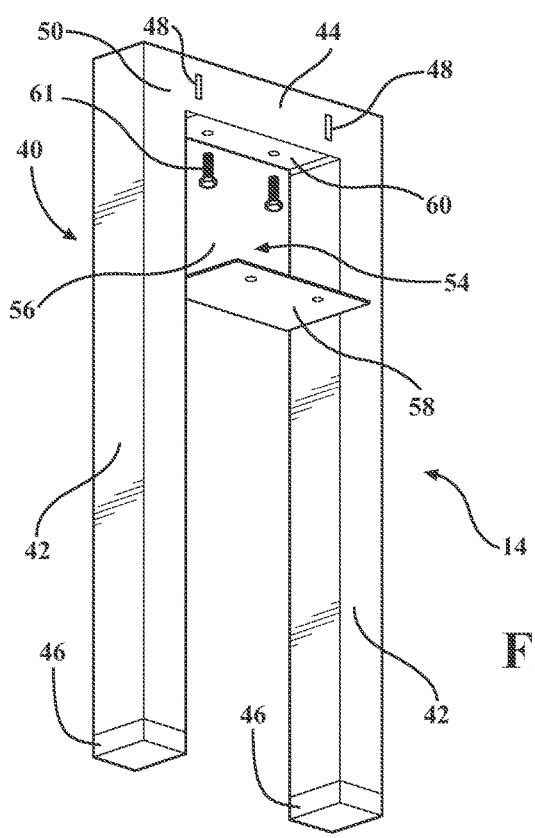
FIG. 6 is a perspective view of a first support member of the present invention.

With reference to FIGS. 1, 2 and 6, the first support member 14 is shown as a U-shaped support member 40. U-shaped support member 40 has two opposed support legs 42 interconnected by a cross support bar 44. Leveling feet 46 are provided for leveling the power and data bridge 10. The first support member 40 is disclosed as the end support for the beam 12 in each embodiment. The member 40 has at least one and as disclosed, two slots 48 in the side 50 of the cross support bar 44. With reference to FIG. 3, tabs 52 protrude from the sides 24 of the beam 12. The tabs 52 are inserted into the slots 48 of the support member 40 to interconnect the beam 12 to the support member 40.

An end cap 54 is mounted to the underside of the support bar 44 to conceal the open end of the beam 12 and provide additional support to the beam 12. The cap 54 as disclosed has a vertical wall 56, for concealing the open end of beam 12, a support ledge 58 for supporting the beam 12 and a fastening lip 60 for fastening the cap 54 to the support bar 44. As disclosed, screws 61 connect the cap 54 to the support bar 44 and the beam 12. It will be appreciated by those of ordinary skill in the art that other methods of fastening the cap 54 could be used, such as tabs, clips, adhesives, etc.

With reference to FIGS. 7 and 8, an intermediate support member 62 is illustrated. The support member 62 is the same as support member 40 with the exception that there are slots 48 on both sides 50 of the support bar 44. The four slots 48 allow two beams 12 to be attached to each side 50 of the support member 62, see FIG. 8. A connection plate 64 having holes 65 which mate with holes 65 in the beam receives screws 61 to connect the ends of beam 12 together. Again screws 61 are illustrated, but one of ordinary skill in the art will appreciate that other connectors or methods could be used, such as tabs, adhesive, welding etc.

Figure 9:
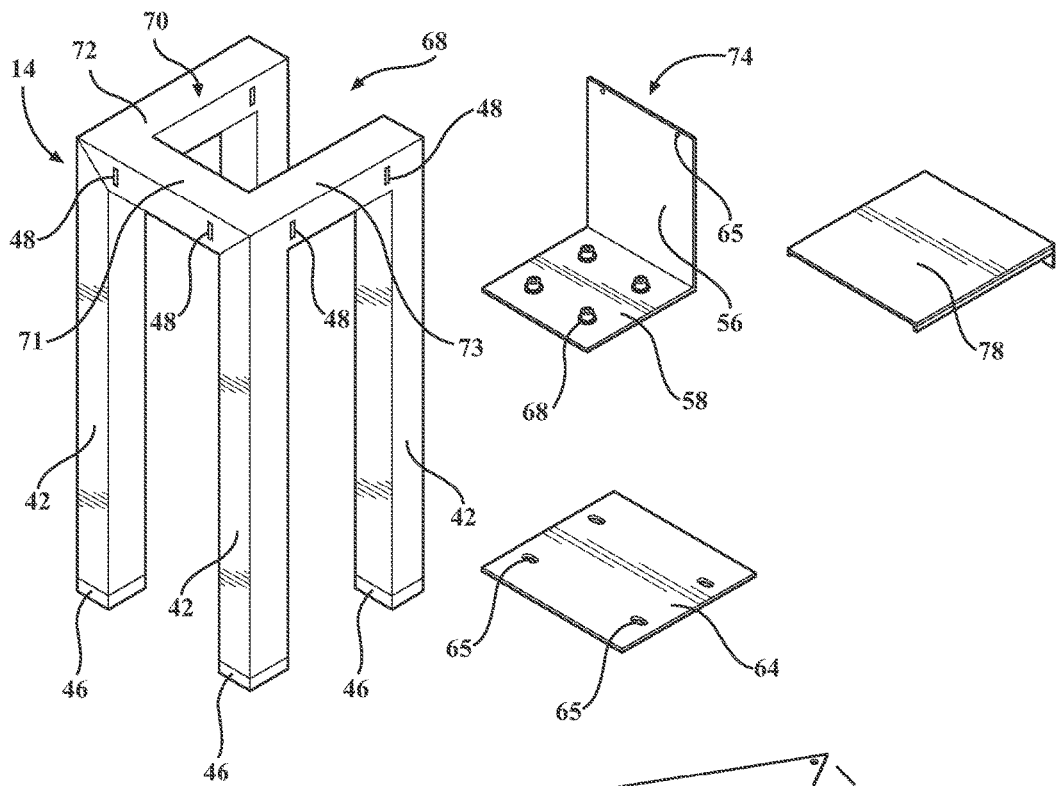
FIG. 9 is a perspective view of an embodiment of the second support member of the present invention.
Figure 10:
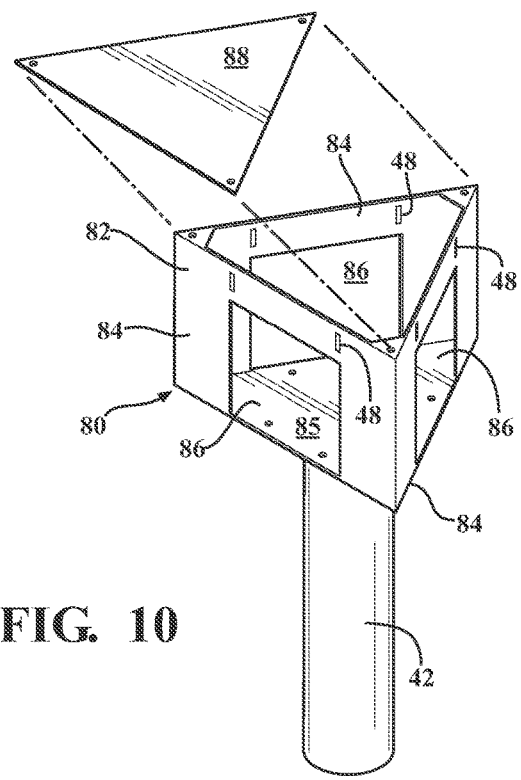
FIG. 10 is a perspective view of an embodiment of the second support member of the present invention.

With reference to FIG. 9, support member 14 is illustrated as a three way support member 68. The three way support member 68 is for connecting three beams 12 to the support member 68. The three way support member 68 has a three arm cross bar 70. The three arm cross bar has first 71, second 72 and third 73 arms with the second 72 and third 73 arms extending at 90 degree angles to the first arm 71. Support legs 42 extend from the cross bar 70. As illustrated there are four legs 42, but as will be appreciated, one, two or three legs could be used as well. Slots 48 are formed in the sides 50 of the support arms 71, 72, and 73 for receipt of tabs 52 on the beams 12.

Figure 20:
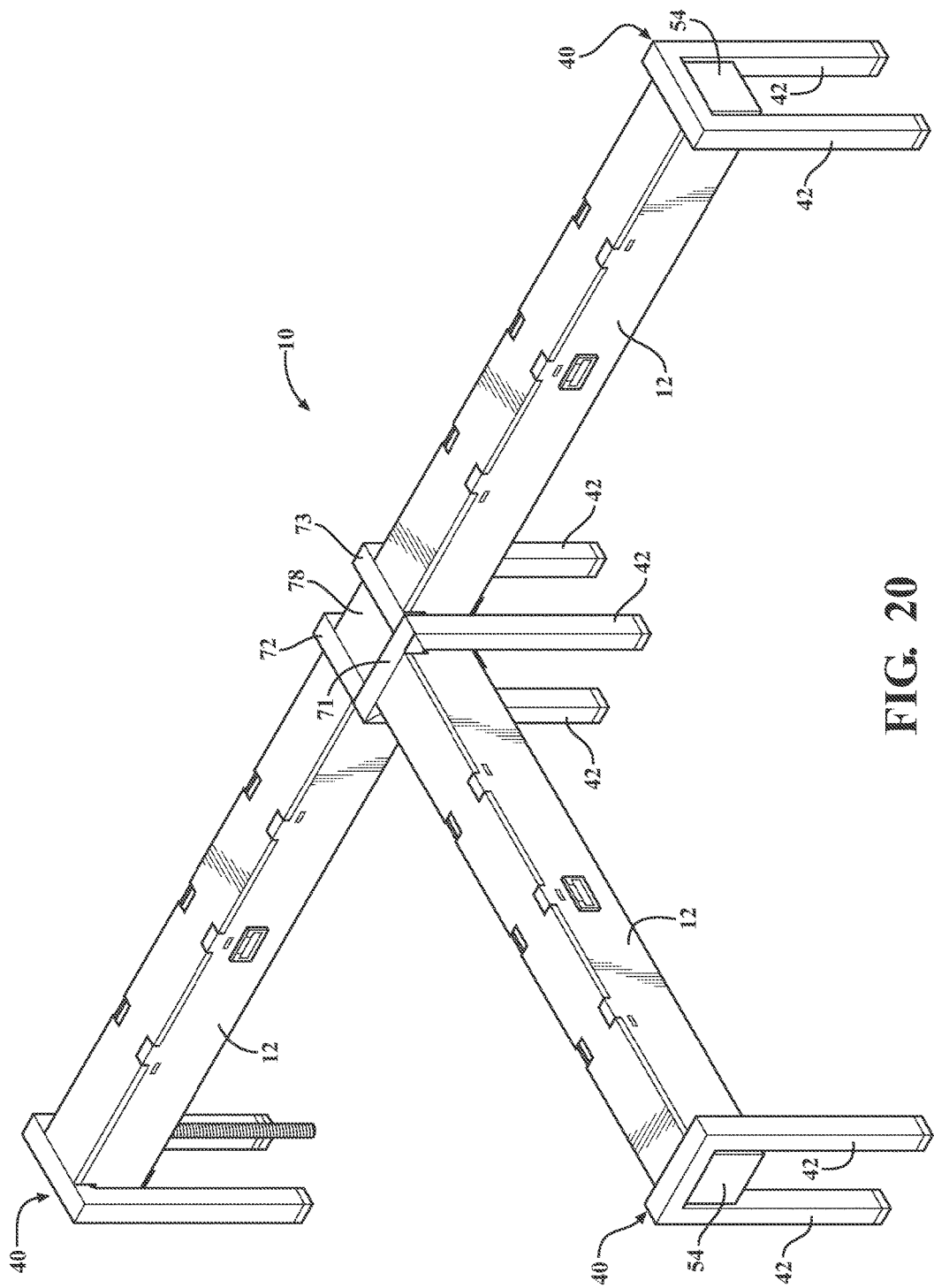
FIG. 20 is a perspective view of a further embodiment of the bridge structure of the present invention.

A second end cap 74 is illustrated. End cap 74 has a vertical wall 56 and support ledge 58. A cover 78 closes the top of the end cap 74 and extends generally parallel to the support ledge 58. Two connection plates 64 connect the three beams 12 to one another and to the support ledge 58. With reference to FIG. 20, a three beam assembly using the three way support member 68 is illustrated.

With reference to FIGS. 10, 12, 13 17, and 18 a 120 degree support 80 is illustrated. Support member 80 is a 120-degree support member for connecting three beams 12. The 120-degree support member 80 has a triangular box 82 with three equilateral sides 84 and a bottom 85. Each of the equilateral sides 84 has slots 48 for receipt of connecting tabs 52 on the beams 12. Openings 86 are provided in each of the sides for the routing of cables and wires. A plate or lid 88 closes the open top of the box 82. As illustrated, the 120 degree support 80 has a single leg 42.

Figures 13, 14:
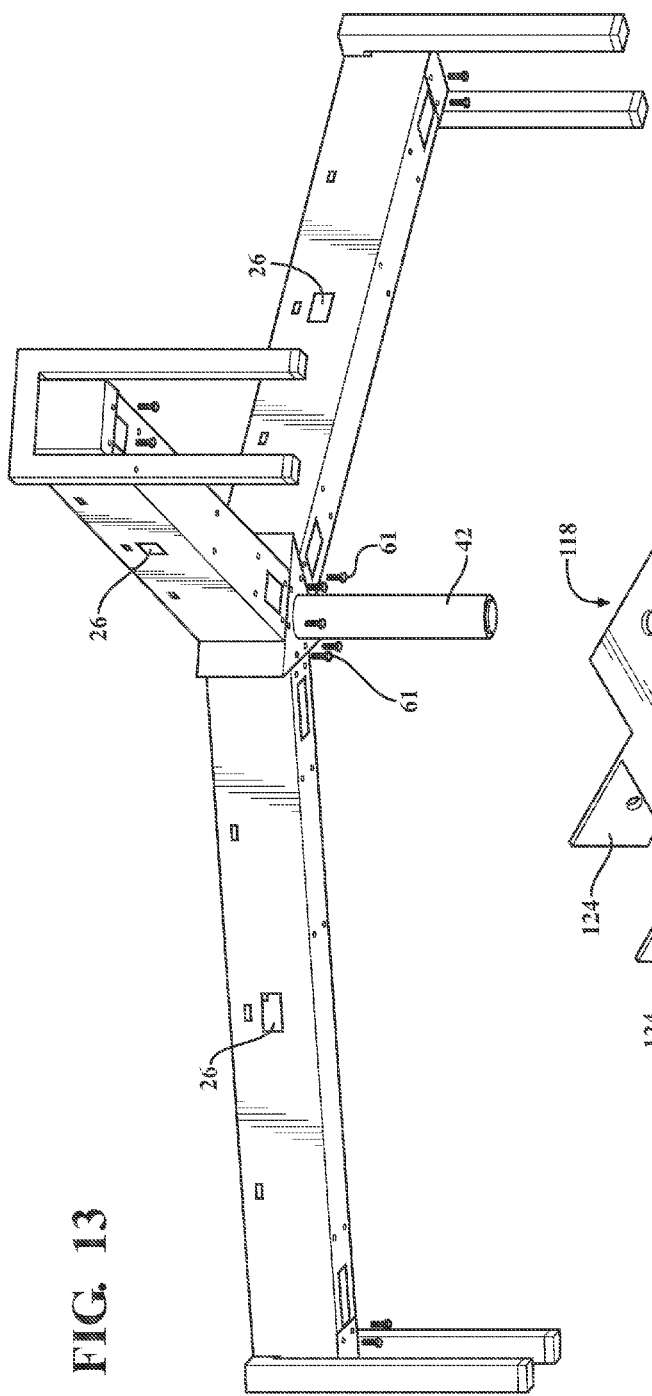
FIG. 13 is a bottom perspective view of FIG. 12.
FIG. 14 is a perspective view of the beam to leg bracket of the bridge structure of the present invention.
Figure 15:
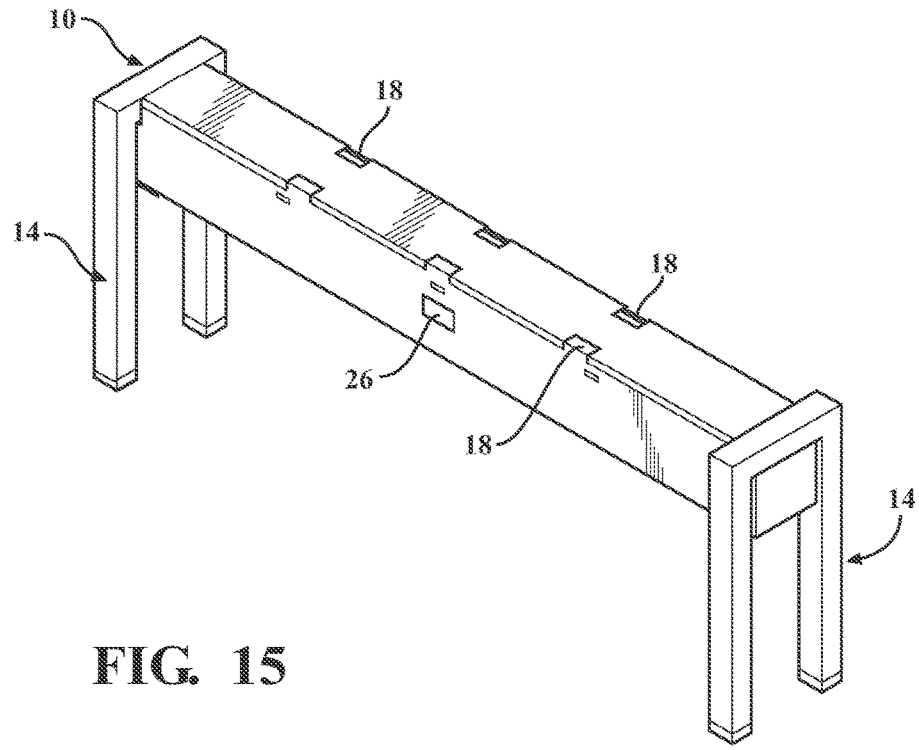
FIG. 15 is a perspective view of a further embodiment of the bridge structure of the present invention.

With reference to FIG. 13, the beams 12 are connected to the support 80 with screws 61. It will also be appreciated that other methods of connecting the beam to the support 80 can be used, including using the plates 64.

Figure 11:
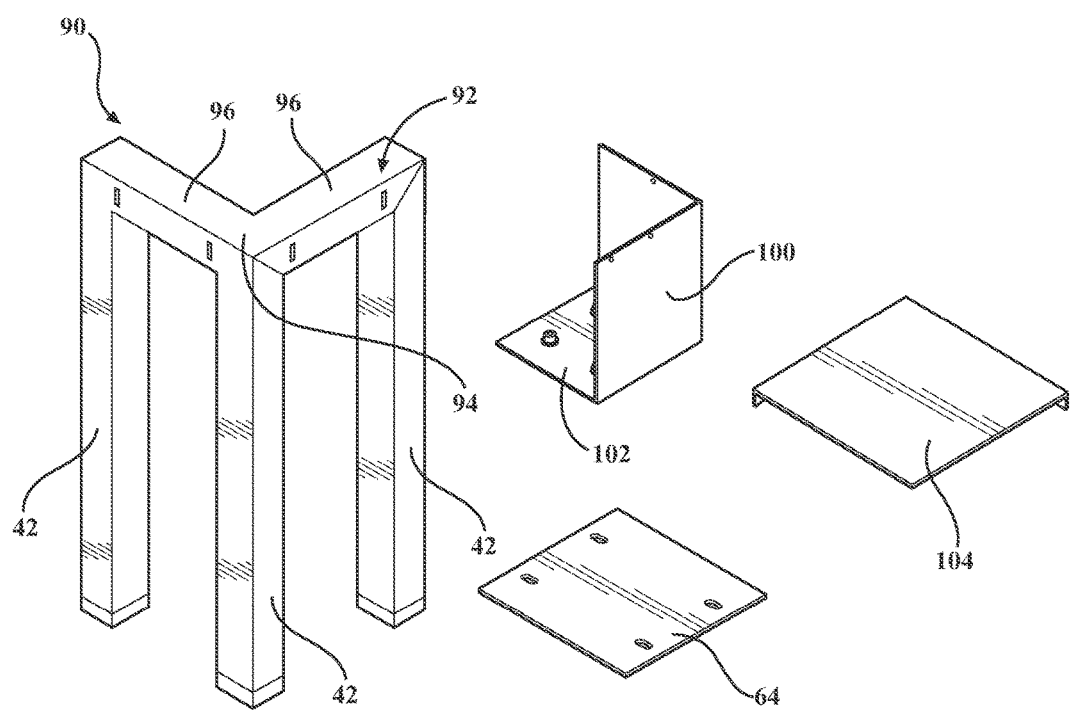
FIG. 11 is a perspective view of an embodiment of the second support member of the present invention.
Figure 12:
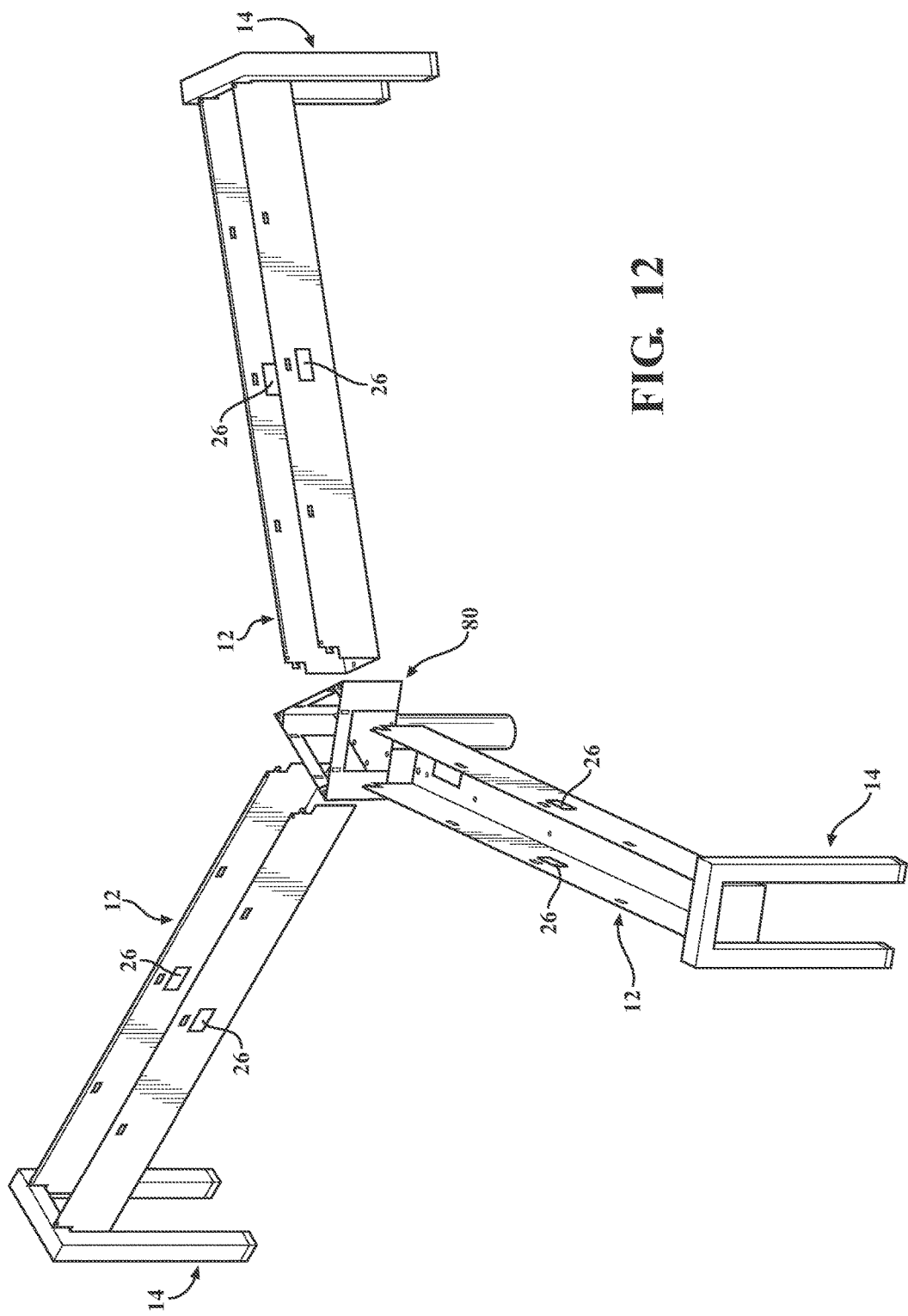
FIG. 12 is an exploded view of a further embodiment of the bridge structure of the present invention.
Figure 19:
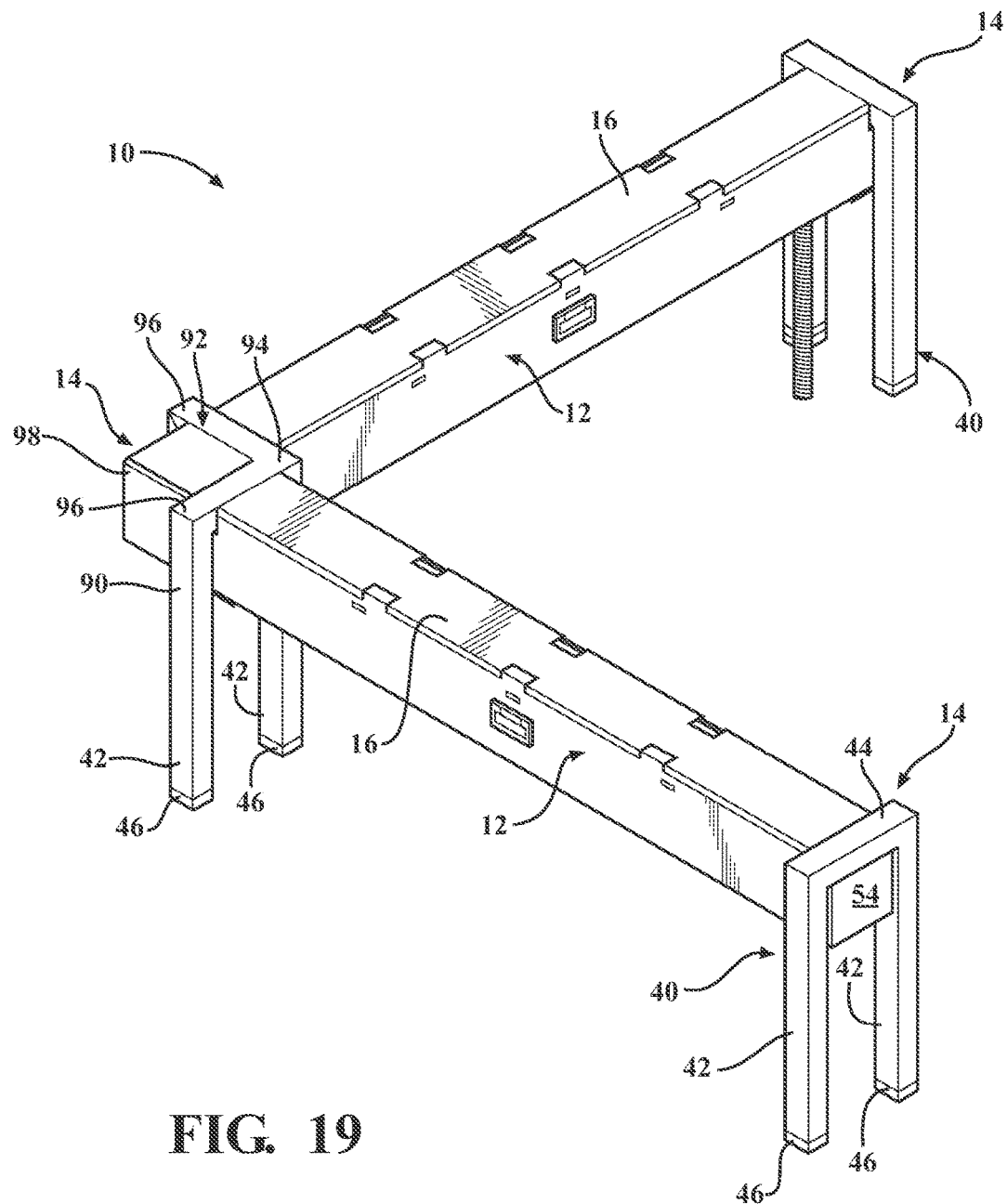
FIG. 19 is a perspective view of a further embodiment of the bridge structure of the present invention.

With reference to FIGS. 11 and 19, a ninety degree support member 90 is disclosed for connecting two beams 12. The ninety degree support member 90 has a v-shaped cross bar 92, having an apex 94 and opposed arms 96. First, second and third support legs 42 support the ninety degree support member 90. It should be appreciated that less than three legs 42 could be used. A first leg 42 extends from said apex 94, a second leg 42 extends from one of the opposed arms 96 and the third leg 42 extends from the other opposed arm 96. Each of the opposed arms 96 has slots 48 for receipt of connecting tabs 52 on the beams 12.

An end cap 98 is provided to conceal the end of the beams 12 without closing their interiors. This allows cables and wires to be routed through the beams 12 and supports 14. The end cap 98 has two angled vertical walls 100, a bottom plate 102 and a top plate 104. The beams 12, and end cap 98 are connected together with connection plates 64 and screws 61.

Figure 4:
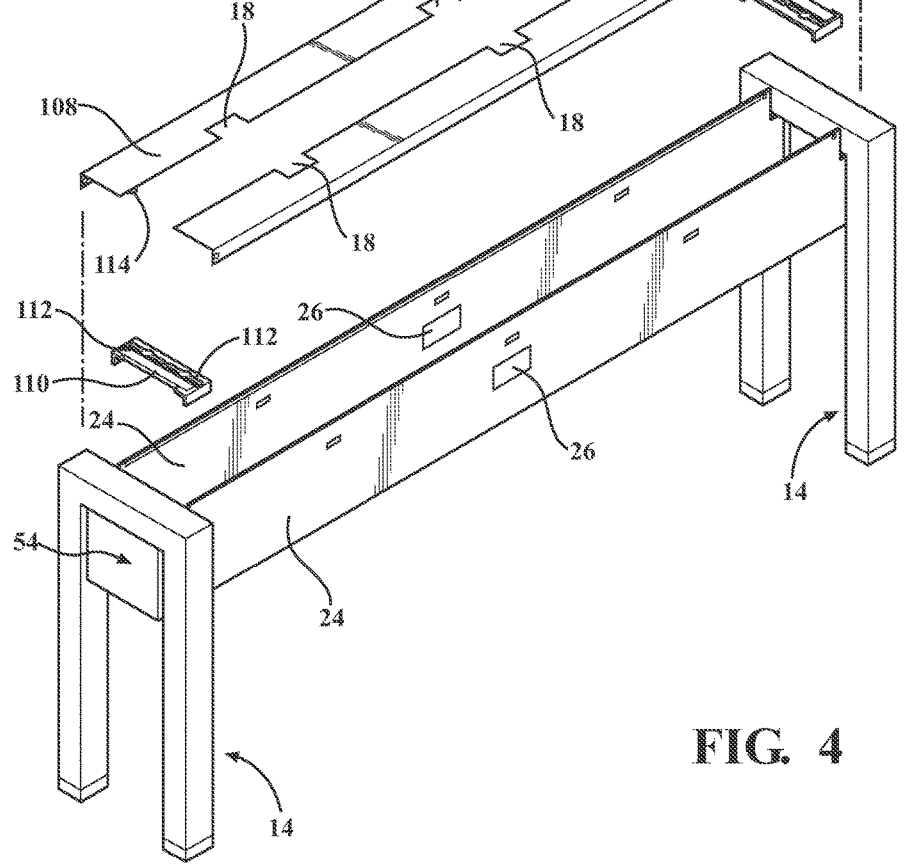
FIG. 4 is a perspective view of an embodiment of the bridge structure of the present invention.
Figure 5:
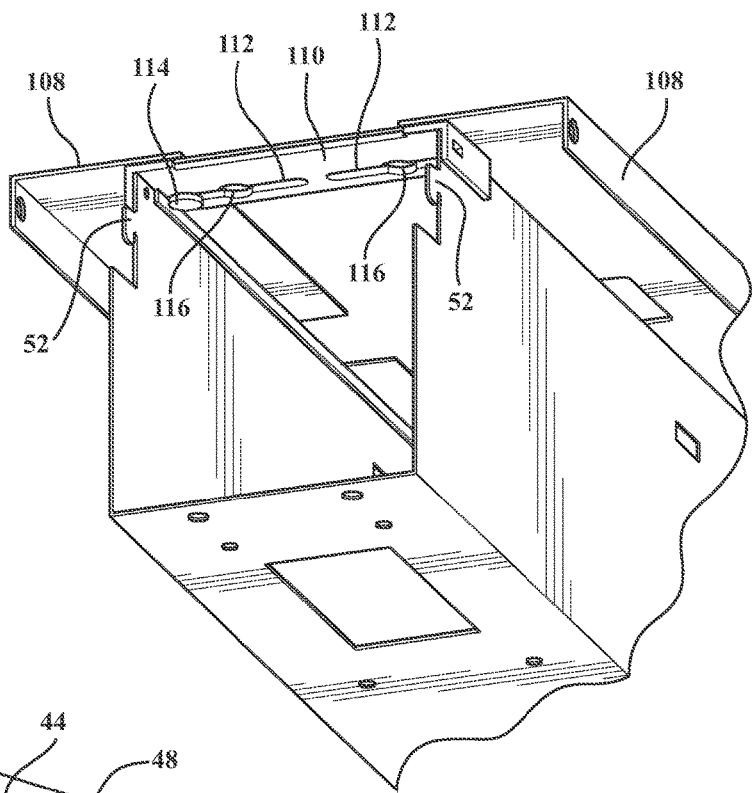
FIG. 5 is a partial perspective view of a second embodiment of the cover of the present invention.

With reference to FIGS. 4 and 5, an alternative embodiment of the cover 16 is illustrated at 106. Cover 106 includes two elongated panels 108 that move laterally with respect to the beam 12. In the disclosed embodiment, a slider bracket 110 is mounted to each of the opposed ends of the beam 12. Each of the slider brackets 110 have a pair of spaced slots 112, which receive one of two spaced pegs 114 with enlarged heads that extend from each of the panels 108. The slots 112 have an opening 116 for receipt of the enlarged head on the pegs 114. Once inserted into the opening 116, the pegs 114 slide within the spaced slots 112 allowing panels 108 to slide laterally with respect to one another.

With reference to FIG. 14, a leg to beam bracket 118 is illustrated for connecting the beam 12 to the legs 42. The leg to beam bracket 118 has a base member 120 for connection to the beam 12 and opposed connectors 122 for connecting to legs 42. The opposed connectors 122 are illustrated with connecting fingers 124. The fingers 124 attach to the legs and the base member 120 attaches to the beam. It will be appreciated that only one finger 124 could be used on each side of the base member 120.

Figure 21:
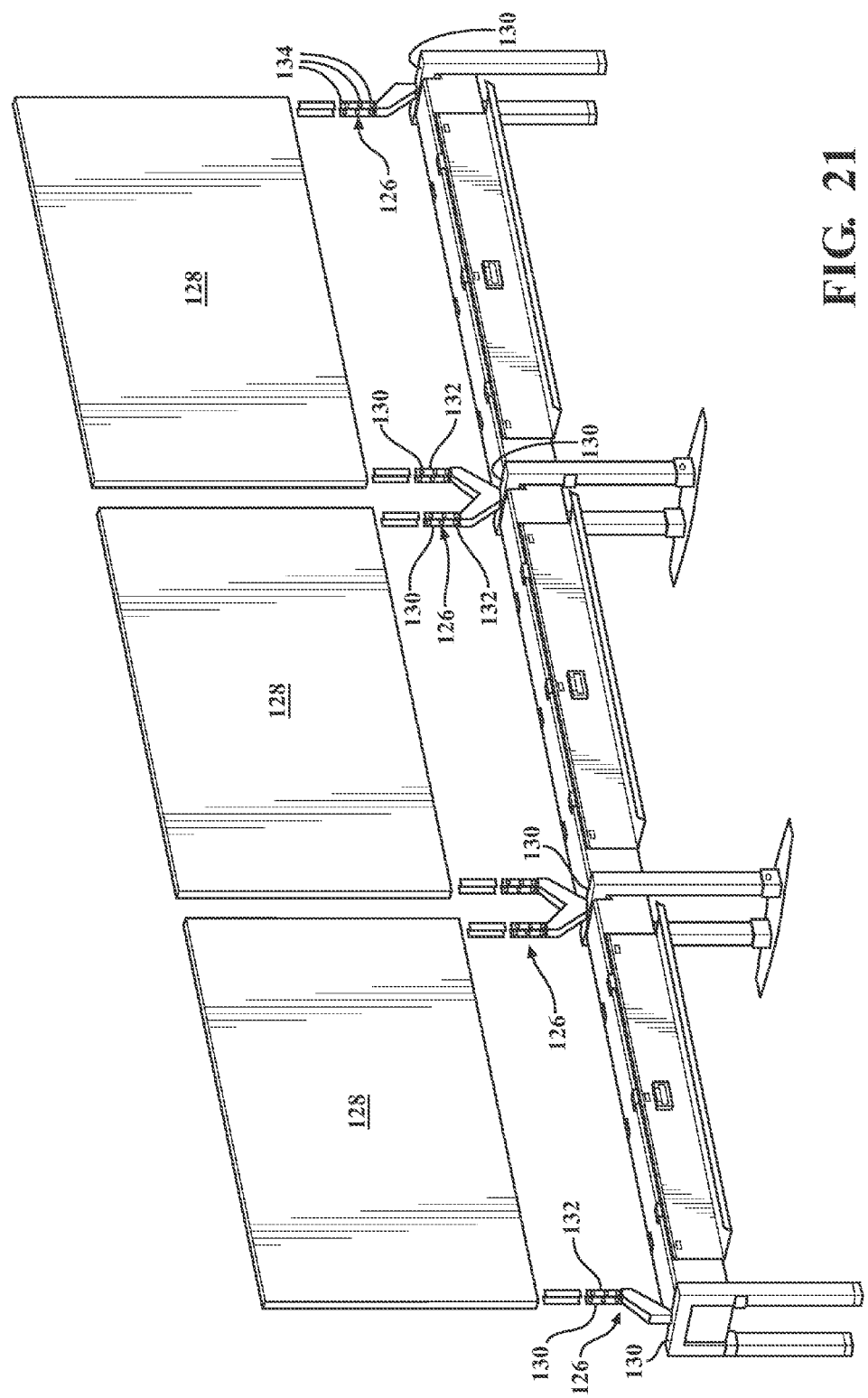
FIG. 21 is a perspective view of the bridge support of the present invention with privacy panels attached.

With reference to FIG. 21, a privacy panel bracket 126 is disclosed for attaching a privacy panel 128 to the bridge 10. The panel bracket 126 includes a base 130 for mounting to the bridge 10 and in particular to the support members 14. The panel bracket 126 has two spaced ears 130 and 132 for receipt of the panel 128. The spaced ears 130 and 132 have at least one set screw 134 and as illustrated six set screws 134. At least one push plate 136 and as illustrated two push plates 136 are provided. The push plates 136 fit between the ears 130 and 132 adjacent the set screw 134 and the privacy panel 128. The set screws 134 can be threaded against the push plates 136 to squeeze the panel 128 within the two spaced ears 130 and 132 to hold the privacy panel 128 in place.

As illustrated, the end brackets 126 have a single set of spaced ears 130 and the intermediate end brackets 126 have two sets of spaced ears 130.

Figure 22:
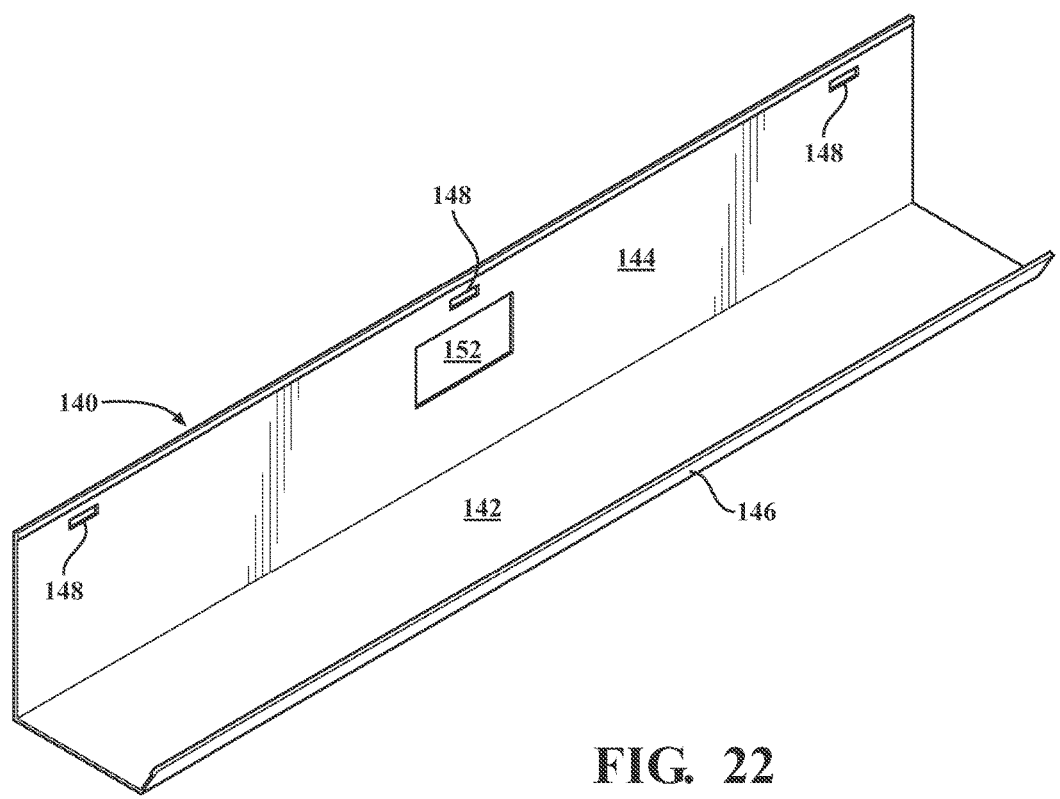
FIG. 22 is a perspective view of the cable tray of the bridge structure of the present invention.

With reference to FIG. 22, a cable tray 140 is illustrated. The cable tray has a cable support surface 142 and a back wall 144. The illustrated support surface 142 has a lip 146. Spaced along the back wall 144 are connecting tabs 148. The connecting tabs 148 are inserted into the mating slots 150 in the beam 12, see FIG. 3. The back wall 144 includes a window 152 that mates with data port opening 26 in the beam 12.

Figure 18:
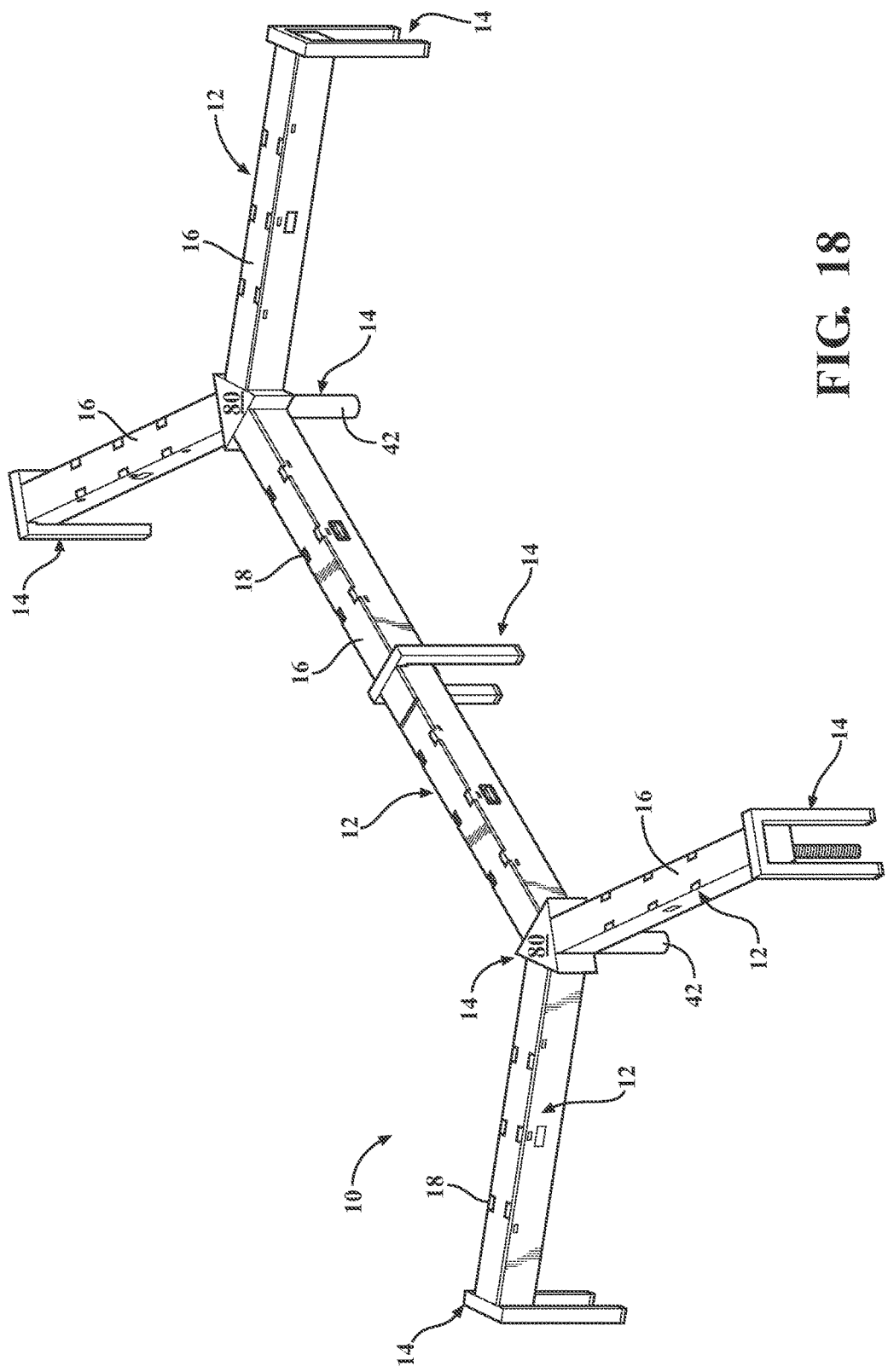
FIG. 18 is a perspective view of a further embodiment of the bridge structure of the present invention.

With reference to the figures and in particular to FIG. 18, it can be seen that many different arrangements can be obtained by using different supports 14. This allows multiple design options to be used by merely substituting different supports 14.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed:

1. A bridge structure for concealing electrical and data connections, said bridge structure comprising:
    at least one beam having a bottom, sidewalls, a cover and opposed open ends, each of said sidewalls having at least one connecting tab protruding outwardly adjacent said open ends, said beam containing at least one electrical outlet or data port;
    at least first and second support members for supporting said beam, said first and second support members being positioned adjacent said opposed open ends of said beam, said first and second support members having at least one slot for receipt of said at least one connecting tab to connect said beam to said first and second support members; said first support member having two opposed support legs interconnected by a cross support bar;
    an end cap mounted to said first support member adjacent said open end of said beam, said end cap having a vertical wall and a support ledge for supporting said beam, said end cap vertical wall concealing said open end of said beam.

2. The bridge structure of claim 1, wherein said legs and said cross support bar are tubes.

3. The bridge structure of claim 1, wherein said end cap includes a fastening lip which is generally parallel to said support ledge, said fastening lip being fastened to said cross support bar.

4. The bridge structure of claim 1, wherein said beam has opposed connecting tabs protruding from each of said sidewalls, and said first and second support members having adjacent slots for receipt of said opposed connecting tabs.

5. The bridge structure of claim 1, wherein said second support member is a 120-degree support member for connecting three beams to said second support member, said 120-degree support member having a triangular box with three equilateral sides, each of said equilateral sides having a slot for receipt of said at least one of said connecting tabs.

6. The bridge structure of claim 1, wherein said second support member is a ninety degree support member for connecting two beams to said second support member, said ninety degree support member having a v-shaped cross bar, said v-shaped cross bar having an apex and opposed arms, and first, second and third support legs, said first leg extending from said apex, said second leg extending from one of said opposed arms and said third leg extending from said other opposed arm;
said opposed arms each having at least one slot for receipt of said at least one tab on each of said two beams.

7. The bridge structure of claim 1, wherein said second support member is a three way support member for connecting three beams to said second support member, said three way support member having a three arm cross bar, said three arm cross bar having a first, second and third arms, said second and third arms extending at 90 degree angles to said first arm; and
said support legs extending from said three arm cross bar;
said first, second and third arms each having at least one slot for receipt of said at least one tab on each of said three beams.

8. The bridge structure of claim 7, further including an end cap, said end cap mounted to said second and third arms.

9. The bridge structure of claim 1, further including a leg to beam bracket for connecting said beam to said at least one of said opposed support legs, said leg to beam bracket having a base member for connection to said beam and opposed connectors for connecting to said at least one of said opposed support legs.

10. The bridge structure of claim 1, wherein said cover includes two elongated panels and a pair of slider brackets, said slider brackets having a pair of spaced slots and spaced pegs mounted through said spaced slots and into said panels;
whereby said panels can slide laterally with respect to one another.

11. The bridge structure of claim 1, further including a panel bracket for attaching a panel to said bridge, said panel bracket including a base for mounting to said bridge and two spaced ears for receipt of the panel, said spaced ears having at least one set screw;
at least one push plate, said push plate being adapted to fit between said ears, adjacent said set screw such that said set screw can be threaded against said push plate to squeeze a panel within said two spaced ears.

12. A bridge structure for concealing electrical and data connections, said bridge structure comprising:
at least one beam having a bottom, sidewalls, a cover and opposed open ends, each of said sidewalls having at least one connecting tab protruding outwardly adjacent said open ends, at least one electrical outlet or data port mounted within said beam;
at least first and second support members for supporting said beam, said first and second support members being positioned adjacent said opposed open ends of said beam, said first and second support members having at least one slot for receipt of said at least one of said connecting tabs to connect said beam to said first and second support members;
said first support member is generally u-shaped;
an end cap mounted to said first support member adjacent said open end of said beam, said end cap having a vertical wall concealing said open end of said beam.

13. The bridge structure of claim 12, wherein said end cap includes a support ledge for supporting said beam.

14. The bridge structure of claim 12, wherein said first support member has two opposed support legs interconnected by a cross support bar.

15. The bridge structure of claim 14, wherein said legs and said cross support bar are tubes.

16. The bridge structure of claim 14, wherein said end cap includes a fastening lip which is generally parallel to said support ledge, said fastening lip being fastened to said cross support bar.

17. The bridge structure of claim 14, further including a leg to beam bracket for connecting said beam to said at least one of said support legs, said leg to beam bracket having a base member for connection to said beam and opposed connectors for connecting to said at least one of said support legs.

18. The bridge structure of claim 12, wherein said beam has opposed connecting tabs protruding from each of said sidewalls, and said first and second support members having adjacent slots for receipt of said opposed connecting tabs.

19. The bridge structure of claim 12, wherein said second support member is a 120-degree support member for connecting three beams to said second support member, said 120-degree support member having a triangular box with three equilateral sides, each of said equilateral sides having a slot for receipt of said at least one connecting tab.

20. The bridge structure of claim 12, wherein said second support member is a ninety degree support member for connecting two beams to said second support member, said ninety degree support member having a v-shaped cross bar, said v-shaped cross bar having an apex and opposed arms, and first, second and third support legs,
said first leg extending from said apex, said second leg extending from one of said opposed arms and said third leg extending from said other opposed arm;
said opposed arms each having at least one slot for receipt of said at least one tab on each of said two beams.

21. The bridge structure of claim 12, wherein said second support member is a three way support member for connecting three beams to said second support member, said three way support member having a three arm cross bar, said three arm cross bar having a first, second and third arms, said second and third arms extending at 90 degree angles to said first arm; and
support legs extending from said three arm cross bar;
said first, second and third arms each having at least one slot for receipt of said at least one tab on each of said three beams.

22. The bridge structure of claim 21, further including an end cap, said end cap mounted to said beams attached to said second and third arms.

23. The bridge structure of claim 12, wherein said cover includes two elongated panels and a pair of slider brackets, said slider brackets having a pair of spaced slots and spaced pegs mounted through said spaced slots and into said panels;
whereby said panels can slide laterally with respect to one another.

24. The bridge structure of claim 12, further including a panel bracket for attaching the panel to said bridge, said panel bracket including a base for mounting to said bridge and two spaced ears for receipt of a panel, said spaced ears having at least one set screw, at least one push plate, said push plate being adapted to fit between said ear, adjacent said set screw such that said set screw can be threaded against said push plate to squeeze a panel within said two spaced ears.

25. A bridge structure for concealing electrical and data connections, said bridge structure comprising:
at least first and second beams each having sidewalls, a bottom, an open top and first and second opposed open ends;
a first support member connected to said first beam adjacent said first open end;
a second support member mounted to said first beam at said second open end;
said second beam first open end mounted to said second support member;
a third support member mounted to said second open end of said second beam;
said second support member having an open interior;
with each of said support members having two opposed support legs interconnected by a cross support bar;
whereby cable and wiring can be routed within said first and second beams and said second support member.

26. The bridge structure of claim 25, further including an end cap mounted to at least one of said support members adjacent said open end of one of said adjacent beams, said end cap having a vertical wall concealing one of said open ends of one of said adjacent beams.

27. The bridge structure of claim 26, wherein said end cap includes a support ledge for supporting said beam.

28. The bridge structure of claim 25, wherein said first support member has two opposed support legs interconnected by a cross support bar.

29. The bridge structure of claim 28, wherein said legs and said cross support bar are tubes.

30. The bridge structure of claim 28, wherein said end cap includes a fastening lip which is generally parallel to said support ledge, said fastening lip being fastened to said cross support bar.

31. The bridge structure of claim 25, wherein said first and second beams have opposed connecting tabs protruding from each of said sidewalls, and
said first, second and third support members having adjacent slots for receipt of said opposed connecting tabs.

32. The bridge structure of claim 25, wherein said second support member is a 120-degree support member for connecting fourth and fifth beams to said second support member, said 120-degree support member having a triangular box with three equilateral sides.

33. The bridge structure of claim 25, wherein said second support member is a ninety degree support member for connecting a fourth beam to said second support member, said ninety degree support member having a v-shaped cross bar, said v-shaped cross bar having an apex and opposed arms, and at least one support leg.

34. The bridge structure of claim 25, wherein said second support member is a three way support member for connecting third and fourth beams to said second support member, said three way support member having a three arm cross bar, said three arm cross bar having a first, second and third arms, said second and third arms extending at 90 degree angles to said first arm; and at least one support leg extending from said three arm cross bar.

35. The bridge structure of claim 25, further including an end cap, said end cap mounted to said support member to conceal said open ends of said beams.

36. The bridge structure of claim 25, further including a cover, said cover includes two elongated panels, a pair of slider brackets, said slider brackets having a pair of spaced slots, spaced pegs mounted through said spaced slots and into said panels, whereby said panels can slide laterally with respect to one another.

37. The bridge structure of claim 25, further including a panel bracket for attaching a panel to said bridge, said panel bracket including a base for mounting to said bridge and two spaced ears for receipt of a panel, said spaced ears having at least one set screw;
at least one push plate, said push plate being adapted to fit between said ears, said set screw can be threaded against said push plate to squeeze a panel within said two spaced ears.

38. The bridge structure of claim 25, further including at least one cable support tray attached to at least one of said beams.

* * * * *